(12) United States Patent
Gogerly

(10) Patent No.: US 11,521,627 B2
(45) Date of Patent: *Dec. 6, 2022

(54) METHOD, APPARATUS AND SYSTEM FOR EMBEDDING DATA WITHIN A DATA STREAM

(71) Applicant: SONIC DATA LIMITED, London (GB)

(72) Inventor: Simon Gogerly, London (GB)

(73) Assignee: SONIC DATA LIMITED, London (GB)

( * ) Notice: Subject to any disclaimer, the term of this patent is extended or adjusted under 35 U.S.C. 154(b) by 70 days.

This patent is subject to a terminal disclaimer.

(21) Appl. No.: 17/121,163

(22) Filed: Dec. 14, 2020

(65) Prior Publication Data
US 2021/0142810 A1 May 13, 2021

Related U.S. Application Data

(63) Continuation of application No. 16/062,708, filed as application No. PCT/GB2016/053796 on Dec. 2, 2016, now Pat. No. 10,923,134.

(30) Foreign Application Priority Data
Dec. 15, 2015 (GB) .................... 1522090

(51) Int. Cl.
G06F 21/16 (2013.01)
G11B 20/00 (2006.01)
G10L 19/018 (2013.01)

(52) U.S. Cl.
CPC ............ *G10L 19/018* (2013.01); *G06F 21/16* (2013.01); *G11B 20/00891* (2013.01)

(58) Field of Classification Search
CPC .. G06F 21/16; G11B 20/00891; G10L 19/018
See application file for complete search history.

(56) References Cited

U.S. PATENT DOCUMENTS 6,215,608 B1 * 4/2001 Serrano ............. G11B 5/59605
360/60
6,650,662 B1 * 11/2003 Arnaud ................ H04Q 1/4575
370/526

(Continued)

FOREIGN PATENT DOCUMENTS

WO 2013017966 A1 2/2013

OTHER PUBLICATIONS

Bender et al. "Techniques for data hiding." IBM Systems Journal 35.3.4 (1996): 313-336.

(Continued)

*Primary Examiner* — Mohammad A Siddiqi
(74) *Attorney, Agent, or Firm* — Leason Ellis LLP

(57) ABSTRACT

The invention resides in a method of placing a code, having a plurality of digits, in original data having media data including audio data, such as a music video, piece of music or music track, to produce coded data. The method determining an area of original data where a digit of the code can be placed to inhibit detection using a placement criteria. A coding strategy determines at least one of the format or location of a digit of the code in coded data. The or each digit of the code has a melodic or sympathetic relationship with a characteristic, such as an audio characteristic, of the corresponding original data in the at the location in which it is placed. Digits are added to the original data and outputting coded data. Similarly, the invention resides in a method for decoding and devices and systems for implementing said methods.

23 Claims, 7 Drawing Sheets

(56) References Cited

U.S. PATENT DOCUMENTS

| | | | |
|---|---|---|---|
| 8,762,146 B2* | 6/2014 | Geyzel | G10L 19/018 |
| | | | 704/235 |
| 9,311,924 B1* | 4/2016 | Blesser | G10L 19/018 |
| 2002/0071135 A1* | 6/2002 | Takeda | H04N 1/00092 |
| | | | 358/1.14 |
| 2005/0033579 A1 | 2/2005 | Bocko et al. | |
| 2006/0180005 A1* | 8/2006 | Wolfram | G10H 1/0025 |
| | | | 84/609 |

OTHER PUBLICATIONS

International Search Report in corresponding International Patent Application No. PCT/GB2016/053796, dated Feb. 13, 2017. 4 pages.

International Preliminary Report on Patentability in corresponding International Patent Application No. PCT/GB2016/053796, dated Jun. 19, 2018. 8 pages.

* cited by examiner

METHOD, APPARATUS AND SYSTEM FOR EMBEDDING DATA WITHIN A DATA STREAM

CROSS-REFERENCE TO RELATED PATENT APPLICATIONS

This application is a Continuation of U.S. application Ser. No. 16/062,708, filed Jun. 15, 2018, which is a U.S. National Stage Application under 35 U.S.C. § 371 of International Patent Application No. PCT/GB2016/053796, filed Dec. 2, 2016, which claims the benefit of priority under 35 U.S.C. Section 119(e) of British Patent Application number GB 1522090.8 filed Dec. 15, 2015, all of which are incorporated by reference in their entireties. The International Application was published on Jun. 22, 2017, as International Publication No. WO 2017/103565 A1.

BACKGROUND OF THE INVENTION

The invention relates to a method of embedding or placing a code or signal within media data containing audio data. The invention also relates to a device configured to (i) encode an original media data with a code, and/or (ii) decode a previously coded media data to extract the code and/or (iii) track and/or record the use of the media data using said code. The invention also resides a system configured to implement the method and/or having said device. In particular, the invention relates to a method, device and system for adding, tracking and/or monitoring use of media data using a code placed in said data using steganography.

Being able to track the point of origin, or route, that digital content has taken, at the point of use often requires a source file, or frame of reference. Tracking the playback of media such as film, music, television and games—for content tracking and monitoring—has many applications. Tackling piracy on such media is an obvious benefit but it is equally important to tracking, monitoring and delivery systems, such a media data streaming services, sales applications and radio-play.

Embedding a signal within a larger message is not a novel concept. For media, steganography is preferred over cryptography and watermarking because the technique aims to retain the original media data and conceal a signal within the media data without detection. Cryptography results in encryption of the entire message, while watermarking is detectable, but interferes with the media data.

It is essential that coded media data can be traced and the code identified without access to the original source. A reader must be able to identify the origin of the content source, along with a code and/or meta data.

Known techniques have relied on classical signal processing approaches, such as noise encapsulation, accidental feature detection and other low-level approaches. Known techniques often apply steganography methods applied to image data to audio as well. Further, known techniques rely on noise-methods or modification of the media data, such as adjusting the least significant bit.

To be effective and/or accepted in the media industry coded media data must be copyable and convertible in both digital and analogue formats. Most importantly, media data must be coded such that coding is imperceptible to, at least, the ear of a professional music producer.

However, as audio has become an increasingly favoured medium for steganography it is recognized that the Human Auditory System (HAS) is able to detect sound over a wide dynamic range—perceiving sound over a range of power greater than one billion to one, and a range of frequencies greater than one thousand to one. The human ear has an acute sensitivity to additive random noise. Consequently, a human is able to detect changes in a sound file as low as one part in ten million W.

Despite these challenges the inventors have established a method of encoding media data and means for implementing the method for any media data comprising audio data, without limitation.

It is an object of the present invention to address problems and limitations of known coding for monitoring purposes and to provide an improved apparatus, method or system for placing a code with media data, or extracting a code from coded media data, such that said placement is robust yet imperceptible to a human ear.

SUMMARY OF THE INVENTION

In general terms the invention resides in a method of placing a code in original data to create coded data or extracting a code from said encoded data, or a device or system for placing or extracting a code. The code has a plurality of digits, which are placed in the original data having media data including audio data. A digit of the code has a relationship with the original data. The format of the digit has a sympathetic relationship with the original data. In this way the digit is a distinct addition to the original data yet cannot be perceived when coded data is played back because it is discretely added and harmonious with the audio component of the original data.

The methods or apparatus can determine an area of original data where a digit of the code can be placed to inhibit detection using a placement criteria when coding, or the inverse of said placement criteria when decoding. A coding strategy can be used to determine the format and/or location of a code in the determined area. The coding strategy can determine the number of times a code is occurs in coded data. Underlying the invention is the format of the digits of the code, which have a melodic or sympathetic relationship with a characteristic, such as an audio characteristic, of the corresponding original data at the location in which it is placed.

From one aspect, the invention resides in a method of placing a code, having a plurality of digits, in original data having media data including audio data, such as a music video, piece of music or music track, to produce coded data, the method: determining an area of original data where a digit of the code can be placed to inhibit detection using a placement criteria; applying a coding strategy to determine at least one of the format or location of a digit of the code in coded data, wherein the or each digit of the code have a melodic or sympathetic relationship with a characteristic, such as an audio characteristic, of the corresponding original data in the at the location in which it is placed; and adding a digit to the original data and outputting coded data.

The determination and/or coding strategy can be defined or programmed using a key, such as an encryption key or algorithm.

The term "corresponding" can describe the original data before or preceding a location, at least, and additionally or alternatively can mean after the placement location—it can mean within a number of period of a frequency of a determined area or between the start of the determined area and the location. This meaning equally applies when decoding.

Melodic, harmonious or sympathetic can be interpreted as being 'resonant with'. In contrast to known steganography techniques, which use bias within the original data, the invention identifies locations and places new, independent elements in addition to the original data, which complement the original data by being melodic or sympathetic with the original data.

The format of the digit can imitate one or more characteristics of the original data preceding the location of the digit. The method can estimate one or more characteristics of the original data at said location based on the original data preceding the location of the digit. This can be achieved through prediction techniques such as extrapolation. This can be done to code live music, or monitoring live playback.

The format of the digit can be agnostic, therefore, to the order of the original data such that no analysis of a piece or track is required before a digit can be placed and the digit can be placed independently of the order, for example, the sequence of notes, melody, piece or song. The method can extrapolate characteristics of the original data preceding said location to calculate the characteristics of the original data at said location. Additionally or alternatively, if coding a pre-recorded track, then a sweep analysis can be carried out before coding.

By place a digit that imitates, or retains a similarity, to the original date preceding the location that the digit is added has the effect of making the coded data more robust because any manipulation to the coded data (for example, to avoid detection of the code) is made more difficult because any change applied to the coded data (preceding the location of the digit) will also be applied to the digit that has been added—thus the process of identifying a digit can employ the same placement criteria and coding strategy used to add the digit because the digit retains a relationship, set by the coding strategy, with the original data. The format of the placed digit, at said location, can have a harmonic relationship with the characteristics of the corresponding original data at said location. The relationship can be any musical relationship, such as a semi-tone higher, or a complimentary chord.

The amplitude of the placed digit can be lower than the amplitude of the characteristic of the corresponding original data at said location.

The pitch of the placed digit compared to the pitch of the corresponding original data at said location, can differ by at least one of one or more octaves, overtones or semi-tones.

Determining a determined area of original data can include analysing changes of one or more characteristics of the original data and selecting an area of original data where a digit of the code is to be placed by placing a digit of the code that is sympathetic or melodic with the selected characteristic of said area. This can be part of the placement criteria.

Determining a determined area of original data can include detecting a rate of change of one or more characteristics of the original data and selecting, using a placement criteria, an area of original data following a start point or detection of a rate of change of one of said detected changing characteristics for placement of a digit of the code. This can be part of the placement criteria.

A determined area can have at least one of a high dynamic range, transient increase of signal amplitude and/or frequency, a characteristic change of +/− 4 dB, a high frequency sound analogous with the letters "S" or "T" or of the playing of cymbals. The determined area can include a change in amplitude of a component of the original data having an audio frequency of between 5 kHz and 10 kHz.

A determined area can have a rate of change being at least one of a rate of change in high frequency content, spectral difference, phase deviation, wavelet regularity modules, negative log-likelihood or an attack, such as an increase in signal amplitude. Determination of a determined area can have at least one of wavelength monitoring, gain detection, onset detection or silence detection.

The digit of the code is placed in said determined area at a location which is a predetermined time from a start point of a determined area.

The pitch or frequency of the original data in the determined area is identified and the digit is placed a predetermined number of periods from the start of the determined area of original data in which the digit of the code is to be placed. A digit can be placed a nominal number of periods from start of determined area, such as 3, 5 or 8 periods from said start.

The characteristics of the original data can be identified including the pitch of a characteristic with the (i) greatest amplitude and/or (ii) rate-of-change of a characteristic of the original data that meets a placement criteria, to determine an area of original data where a digit of the code is to be placed. In this way audible detection of a code is inhibited.

The characteristics of the original data in the determined area can be identified, including the pitch of a characteristic of the original data that meets a placement criteria, and wherein the length of a digit of the code is one period of said pitch.

A digit can be formatted to have the same phase and/or wavelength as the original data in the area in which it is added.

Digits can be placed individually, sequentially and/or in patterns. A single digit can be added per determined area. Three digits can be added in an area and be sequential or spaced. Each determined area can preferably have less than 3, less than 5 or less than 9 digits.

The coded data can comprise two audio signals or channels, such as left and right audio channels for stereo sound, and the signals representing the digits in each channel are substantially 180-degrees out of phase. This facilities inhibition of detection by a human ear because when both channels are played back the human ear cancels out the sound.

In each case the invention adds a piece of code to original data by a deterministic selection technique or analysis that determines the area for placement and/or assesses the characteristics of the original data, determines a location where a code is to be added and determines the format of the code. A coding strategy can be used to determine the format and/or the placement and/or the number of times a code is occurs in coded data. It is stressed that the invention is deterministic and independent or agnostic to the original data. The or each aspect of the invention applied in encoding can be applied to decoding by applying the same logic. Therefore, the deterministic nature and coding strategy can be a key used to find digits and lower the cost and lower the error rate of doing so.

According to another aspect, the invention resides in a method of analysing coded data having a code therein, said code having a plurality of digits, and original data having media data including audio data, such as a music video, piece of music or music track, to identify said code, the method: reading the coded data, using a placement criteria, to determine an area of original data where a digit of said code can be placed to inhibit detection; determining in said determined area, using a coding strategy, at least one of the format or location of a digit of the code in coded data, and identifying a digit of the code at a location in the determined area, wherein the digits of the code have a melodic or sympathetic relationship with a characteristic, such as an audio characteristic, of the corresponding original data in the determined area in which it is placed; and assembling said code from identified digits.

The method can further include reading the coded data to identify the original data and determining within an area of the original data, within the coded data, a location where a digit of the code can be placed to inhibit detection, and reading the coded data in each determined area.

Determining a determined area of original data can include analysing changes of one or more characteristics of the original data and identifying an area of original data where a digit of the code can be placed and reading the coded data in this location to identify a digit of the code that is sympathetic or melodic with the selected characteristic of said area. The placement criteria can be used for selecting.

Determining a determined area of original data can include detecting a rate of change of one or more characteristics of the original data and identifying, using an identification criteria, an area of original data following a start point or detection of a rate of change of one of said detected changing characteristics for placement of a digit of the code. The identification criteria can be used to analyses original data using the same criteria as the placement criteria—to identify digits of code instead of placing said digits.

Characteristics of the original data are identified including the pitch of a characteristic with the (i) greatest amplitude and/or (ii) rate-of-change of a characteristic of the original data that meets a placement criteria, to determine an area of original data where a digit of the code is placed. Despite this technique inhibiting detection in the time and/or frequency domain the utilisation of the identification criteria can enable the method to locate the digits of the code.

The deterministic selection technique and coding strategy can be used to extract a code from encoded data.

The encoding method herein can be configured to add a second code to coded data to generate multi-coded data. The decoding methods can extract a plurality of codes from multi-coded data.

According to another aspect, the invention resides in a device configured to implement the methods herein. The device has a controller having: an analyser configured to scan original data, or coded data having original data, to determine an area of original data, where a digit of a code can be placed to inhibit detection, using a placement criteria; and a processor configured to apply a coding strategy and determine at least one of the format or location of a digit of the code in coded data; and processor configured to add a digit to original data to produce coded data and/or identify a digit of a code within coded data, wherein the digits of the code have a melodic or sympathetic relationship with a characteristic, such as an audio characteristic, of the corresponding original data in the at the location in which it is placed. The processor can have an encoder and/or a decoder.

The device can be configured to add a second code to coded data to output multi-coded data and/or extract a plurality of codes from multi-coded data.

The system can have a data store or can be configured to communicate with a remote server having a store, the system configured to at least one of (i) store information associated with each code, (ii) track information associated with each playback of coded data, and (iii) store revisions of information and (iv) record changes of the code.

According to another aspect, the invention resides in a computer readable storage medium storing one or more programs, said programs having instructions, which when executed by an electronic device perform the methods disclosed herein.

In light of the teaching of the present invention, the skilled person would appreciate that aspects of the invention were interchangeable and transferrable between the aspects described herein, and can be combined to provide improved aspects of the invention. Further aspects of the invention will be appreciated from the following description.

BRIEF DESCRIPTION OF THE FIGURES

In order that the invention can be more readily understood, reference will now be made, by way of example, to the drawings in which:

FIG. 1a is a schematic diagram of a coder and decoder according to the invention, while

DETAILED DESCRIPTION

Figure 1A:
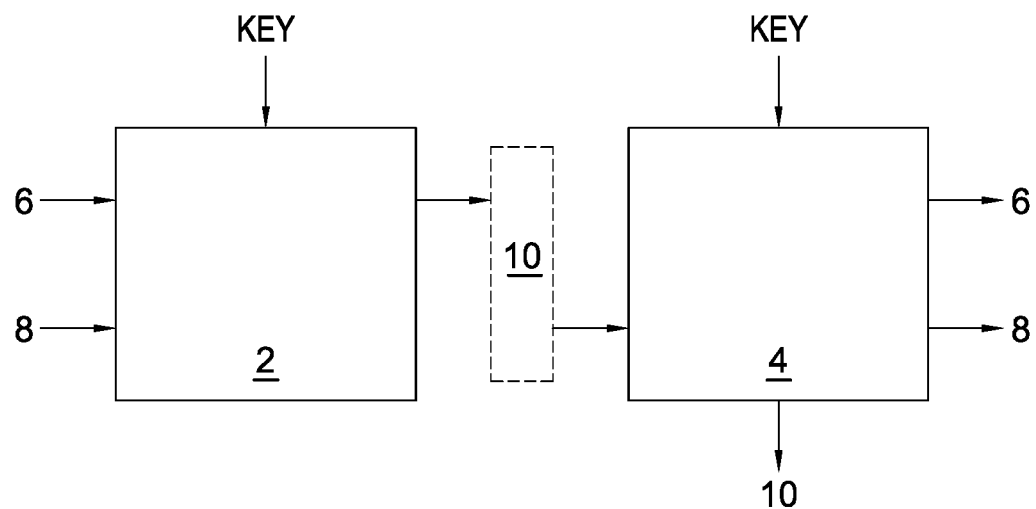

The invention resides in various forms according to its use. In its simplest form an encoder implements a method wherein the encoder receives original data, which includes media data such as an audio track, and analyses the audio track to identify areas in which a code can be added. The original data can be in analogue or digital form, such as a data stream. The data stream can be from a live music source, and said source can be coded before broadcast. For ease of processing it is preferred that the original data is in digital format.

Analysis of the original data can be made in the time-domain and/or frequency domain. However it is audible time-domain characteristics that are used to determine placement and coding. One or more characteristics, preferably dominant characteristics, of the original data are identified and areas in which said dominant characteristics occur are identified as areas in which a code can be placed. This can be determined by a placement criteria. A coding strategy is then used to format the code for placement in the area. The strategy can also determine the position of the digits of the code in said area.

The invention also resides in a decoder that can perform the operation of the encoder in reverse such that coded data, having original data with audio therein, can be read to identify the original data and digits of code by using the same placement criteria and coding strategy to analyse the original data to identify digits of code instead of placing said digits.

The characteristics are used by the coding strategy to format the digits of the code. For example, a characteristic can be the frequency of an audio component in said area and the digits of the code are formatted to be sympathetic with said characteristic such that the code has a melodic relationship with the original data in the region where the code is added to said original data in the area.

The original data and digits of the code are added to form coded data. The coded data can be transmitted and upon receipt be played back such that detection of the code added to the original data is inhibited. The code is discrete and imperceptible such that differences between the playback of the coded data (e.g. a coded music track) and original data cannot be detected by a human ear.

Detection of a digit of the code is inhibited because the characteristics of the data in the area in which the digit is to be placed has been analysed and, using those characteristics as a guide, the digit is added to the original data at a location such that the corresponding i.e. aligned in the time domain, original data has a relationship with the format of the digit. The format of the digit has a sympathetic relationship with the original data. In this way the digit is a distinct addition to the original data yet cannot be perceived when coded data is played back because it is discretely added and harmonious with the audio component of the original data.

Although detectable by a machine or computer such detection requires sophisticated analysis and/or complex processing unless the method of the invention is applied in reverse, wherein the placement criteria and coding strategy used to create the coded data is known and can be used to analyse the coded data to identify the original data and code therein.

The coded data can be in analogue or digital form, such as a data stream. For ease of processing it is preferred that the coded data is in digital format. Analysis of the coded data is preferably performed on identified areas (in the same manner as the encoding) or on the coded data entirely. Although imperceptible, a frequency domain analysis of the coded data can be used to identify the code that has been added to the original data. Using the placement criteria and coding strategy enables such analysis to be carried out efficiently and with substantially lower processing and greater accuracy. Without the placement criteria and coding strategy identification of the code can be more difficult.

In the area in which the code has been placed the sympathetic or melodic relationship between the digit of the code and the original data (within the coded data) in the region where the code is placed is such that a human ear is inhibited from detecting the code. However, frequency domain analysis can be used to identify the code amongst the coded data (containing original data) as not being part of the original data. A code can be compiled from elements of the code added to the original data and detected using analysis such as fast-Fourier transform.

Overall, the invention is able to output and analyse coded data that achieves imperceptible detection by a human ear during audio playback by, at least (i) sympathetic or harmonious addition of a digit of a code to original data, and/or (ii) discrete or minimal code addition and/or (iii) adding a code to original data where psychoacoustic properties of the original data inhibit detection of the code.

The coding, decoding, identification of areas in which a code can be placed, code placement, application features and embodiments of the invention are described below.

Coding

Figure 1B:
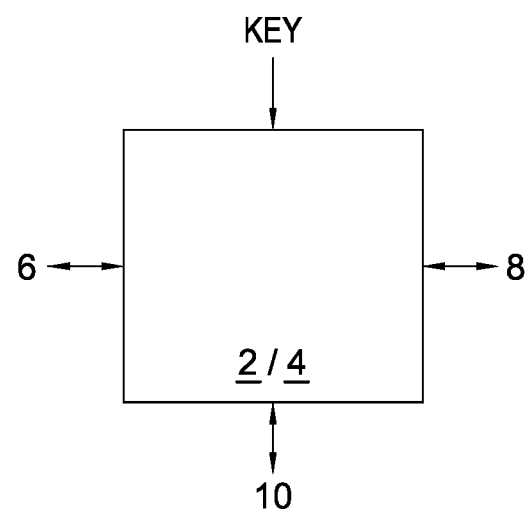
FIG. 1b represents a single device capable of encoding and decoding.

FIG. 1a shows an encoder 2 and a decoder 4, while FIG. 1b shows a single device functioning as an encoder and decoder. Original data 6 and a code 8 are fed in to the encoder. The encoder processes the data 6 and code 8 to output coded data 10. The encoder and decoder can work independently. Coded data 10 fed in to the decoder 4 can be processed to output at least one of the code 8, original data 6 or the coded data 10.

The original data 6 has media data including audio data, such as a music video, piece of music or music track. Data 6 fed in to the encoder is analysed to identify where in the data a code can be placed. The code 8 can have a number of sub-components or digits 8 making up the code, but the term code and digit are treated in this application as representative of the information to be added to the original data and will be interchangeably used herein. A digit herein is not restricted to an alpha-numeric character but is a term used to represent an element of data that forms part of a code. The digit is signal that is added to the original data to form coded data.

By way of example, the code 8 can be a globally unique identifier (GUID) or universally unique identifier (UUID) standard having 128-bits or a 32-bit hexadecimal code.

Figure 2A:
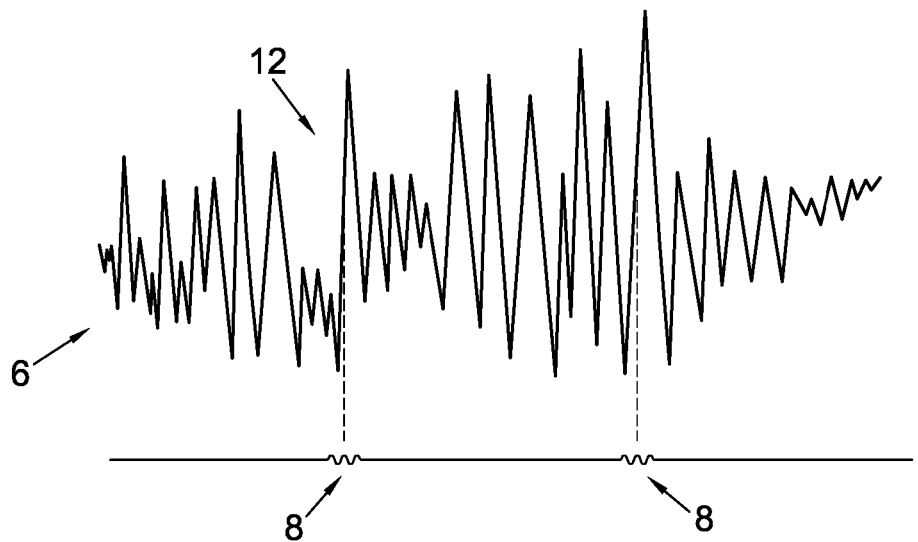
FIGS. 2(a) and 2(b) show an alignment between original data containing audio data and a code that is to be added to the original data, in normal and expanded views respectively.
Figure 2B:
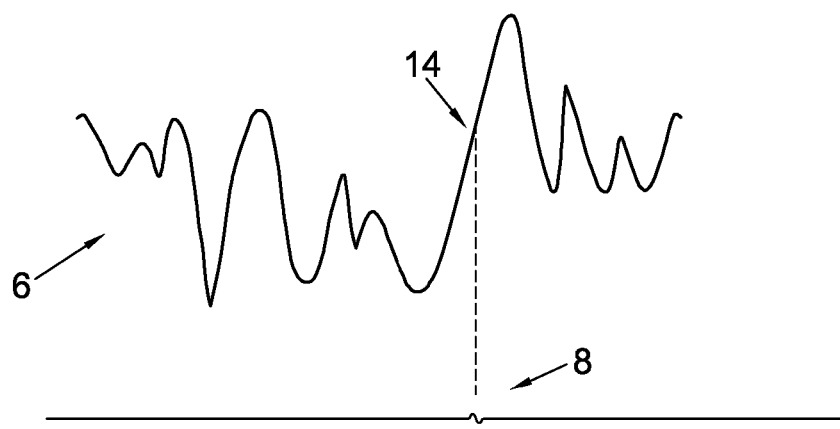

FIG. 2(a) shows a portion of the data 6 and indicates an area 12 where a digit 8 of the code can be placed. The portion of data shows a plot of the amplitude of an audio signal in the time-domain. The area 12 is selected such that a code 8 placed adjacent an area 12 is not easily detectable when added to the data 6 to compile coded data. FIG. 2(b) illustrates an expanded view of a portion of data 6 and a code 8 added in line with a location 14 in a determined area 12. The determination of the determined area 12 has a location 14 therein.

Data 6 input to the encoder 2 is analysed using, for example, a fast-Fourier-transform (FFT) and code 8, to be embedded within the data 6 to produce coded data 10, is formatted. The format of the placed digit 8, at a location 14 with an area 12, is such that the digit has a relationship with a characteristic of the data 6 in said area 12.

The invention will be described in simple terms using a piano and the notes therefrom, and original data having music from a piano therein, as a reference. The music from a piano is polyphonic and indicative of a western-type music system in which each note is a basic unit of music and relates to the pitch or frequency of a sound.

FIG. 3(a) shows an area 12 in which an encoder 2 has determined to be suitable for placing code 8. The horizontal axis represents the time domain (not to scale) and the vertical axis represents the amplitude of the data 6 (not to scale). The area is indicative of an attack, such as a transient change in amplitude and/or frequency. When such an attack is identified, and the encoder determines it to be suitable for placement of code, the pitch or frequency of the music within the data is measured. By way of example, the pitch of the attack as viewed is measured, from the start of the attack—indicated by an arrow—as being a note "A" above Middle-C on a piano keyboard, with a frequency of 440 Hz, often referred to as concert pitch.

An attack is just one parameter that can be used, as part of a placement criteria, to determine where a digit of a code can be placed. The placement criteria can detect area of transient change in the original data, such as areas with high dynamic range. The change can be amplitude and/or frequency. The degree of change can be set, such as a 4 dB change in the audio data of the original data, thus a threshold can be established. Areas of audio data having a "sizzle" sound indicative of the pronunciation of the letter "S" or "T", or of the sound of cymbals, are preferable as determined areas. Overall, transient changes in the frequency range of 5 kHz to 10 kHz are suitable for placing digits to inhibit detection.

Figure 3:
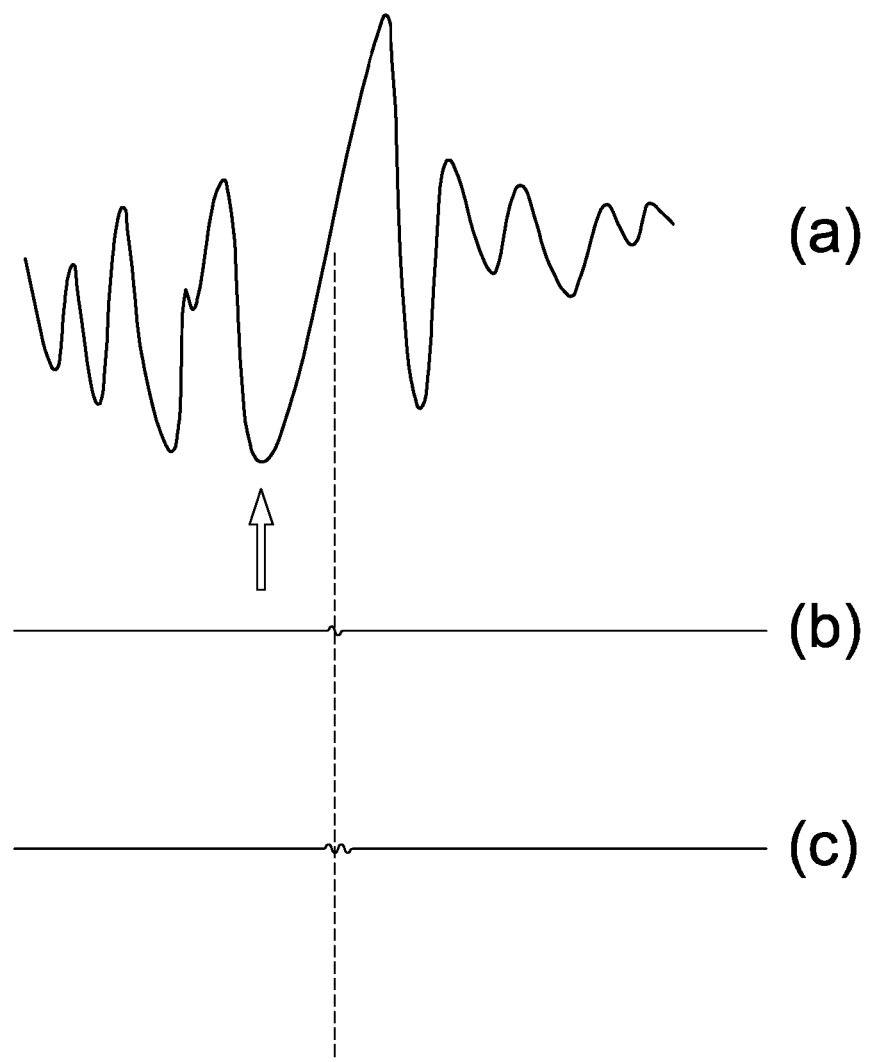
FIG. 3 shows a detailed view of code and original data that are aligned with original data.

A location 14 in the area 12 following, but proximal to, the start of the attack is selected by the encoder for placement of a digit of the code. The encoder 2 takes the GUID and adds a 'bit' of the GUID adjacent the location 14 in the attack in a format that represents a digit of the code 8 that can be read, when decoded, as a 'bit'. The characteristic of the original data 6 at the location 14 is shown in FIG. 3(*b*), and is represented by a sinusoidal wave (not to scale) indicative of a period of one wavelength of a 440 Hz note. FIG. 3(*c*) shows a digit 8 of the code represented by a sinusoidal wave indicative of a period of one wavelength of an 880 Hz note that is in phase with the original data. In this way, coded data at the location 14 at which the digit is added to the original data 6 is a summation of the original data and the digit. The content of the coded data at the location 14 includes two notes—the 440 Hz note (from original data) and the 880 Hz note (functioning as an added digit of the code), which are in-phase, over a single wavelength of the original data in the location. Therefore, the digit 8 is formatted and/or located to have a melodic relationship with the characteristic of the data in the area 12. In this case the digit is formatted to be in harmony with the note "A" detected by being one octave higher than the note in the original data. The format of the digit 8 can be said, therefore, to be a signal that is added to the original data to imitate one or more characteristics of the data in the area preceding the location of the digit. A digit 8 can, therefore, have a harmonic or sympathetic relationship with the characteristics of the corresponding original data at said location.

The digit has a harmonic relationship with the note "A" by, for example, being an octave higher than the single note. This method involves identification of the absolute and/or relative pitch of a single note. The invention is not so limited and, using the piano example again, the method can identify the key signatures (and absolute and/or relative pitch of each note) of a chord on a diatonic scale, such as an 'A Major $7^{th}$' (AM7), in which a root note 'A', $3^{rd}$ factor C#, $5^{th}$ factor 'E' and major $7^{th}$ 'G#' are played simultaneously.

If, for example, an attack were detected and said attack included an AM7 chord then the four different frequencies can be considered for placement of a digit. The coding strategy can then decide whether to place a digit, with a harmonic or sympathetic relationship, aligned with one or more of the notes with the AM7 chord.

To be clear, all notes detected at a determined area of the original data can be assessed by the coding strategy for determining the format and/or location of a digit to be added. Selecting a root note 'A' and the AM7 are just two examples.

The term "corresponding" is used to describe the original data, and more preferably a characteristic of the original data, around the location that the digit is placed. The invention preferably predicts from analysing the original data a trend or pattern that ensures that the placed digit is melodic or sympathetic to the original data at the point in time (in the time domain) at which it is heard during playback of coded data. In other words the original data preceding the location i.e. between the location and said arrow in FIG. 3*a*, can be used to determine the format of the digit at the location. It can also be the case that the digit has a harmonic relationship with the characteristics of the original data after the location.

By placing a digit with a melodic relationship with the original data detection is inhibited. Additionally, the amplitude of the placed digit can be lower than the amplitude of the characteristic of the corresponding original data at said location. The amplitude of the placed digit can follow the trend of the amplitude of the original data such that it blends melodically and at a volume that inhibits detection during playback of coded data.

At each location where a digit is added to the coded data, at the location 14 corresponding to the original data, the digit is added in a manner sympathetic to the structure of the audio itself.

Adding a digit 8 having an octave of a difference compared to the original data 6 is one example of melodic or sympathetic placement of a code. The digit to be added to the data 6, and having a relationship with the characteristics of an area 12 in which a digit is to be placed, can have, alternative musical relationship differences such as (i) a tone or semi-tone difference, (ii) one or more octaves higher or lower than the original data, wherein the melodic relationship includes doubling or halving of the frequency of the data at the location 14.

If the encoder 2 is required to output coded data from a live media data input then the encoder can analyse the characteristics of the data 6 within the determined area and estimate the characteristic of the original data 6 at the location where the digit 8 is to be placed. This estimation can use trending, pattern recognition or extrapolation techniques applied to the original data preceding said location to format the digit to be in harmony with the original data at said location.

In contrast, if original data is to be encoded in a studio then there is no need for any such estimation and an initial sweep, or pre-analysis, of the original data can be made to select areas 12 and/or locations 14 for placement of code. Although additional processing is required to support such advanced analysis the placement criteria used to determine an area of original data where a code is to be placed and the addition of a digit of code to a location in said area remains unchanged and the complexity and cost of the system can be kept low—for both encoding and decoding. This is because the invention resides in the code generated and placed having a melodic, sympathetic or harmonic relationship with the audio where it is placed. Said placement can be deterministic and, therefore, the placement of code in to original data and the identification of code within coded data is performed using the same methods and/or devices. The encoding can be deterministic, yet remain agnostic to the source or the original data. It follows that a deterministic approach, in reverse, facilitates the identification of code within coded data.

Continuing with the GUID example, the 32 hex-digit number is representable by 128 binary digit numbers. Placing a '1' or '0' digit can be achieved by adding a sinusoidal wave for a period of one wavelength, in phase with the original data, of frequencies 880 Hz and 1720 Hz, respectively.

Figure 4:
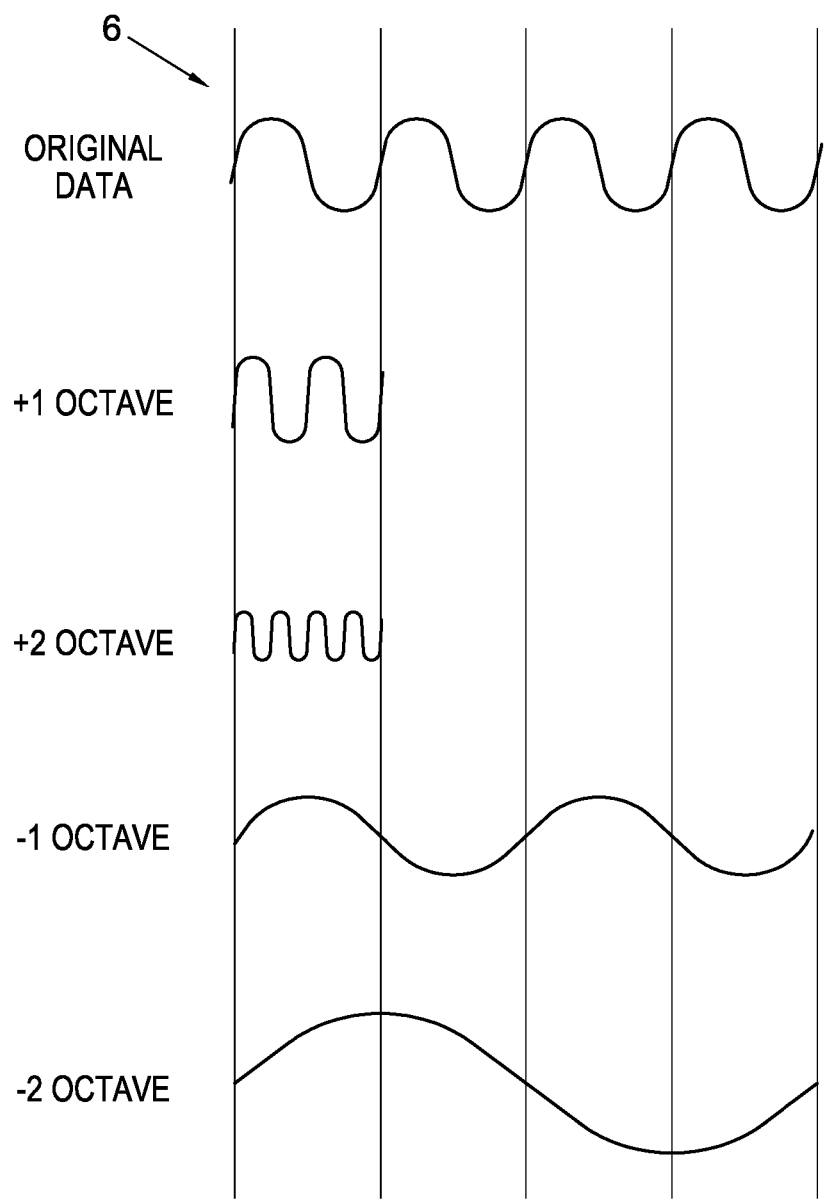
FIG. 4 illustrates the relationship between a signal of the original data and examples of signals that represent digits of the code to be added to the original data.

FIG. 4 illustrates a portion of original data 6 having a wavelength of 440 Hz over four periods. Directly beneath, as shown, are (i) a digit having a binary value '1', represented with a signal having a frequency of 880 Hz in phase with the original data and (ii) a digit having a binary value '0', represented with a signal having a frequency of 880 Hz in phase with the original data. As also shown in FIG. 4 signals with one or more octaves difference from the original data can be used. By aligning the phase of the original data and digit, and having digits of +2, +1, −1 and −2 octaves difference from the original data a base 4 number systems can be used for coding thus expanding the bandwidth of the coded data.

A location 14 in the plurality of areas 12 following, but proximal to, the start of an attack, or equivalent characteristic feature, is selected by the encoder for placement of a digit of the code. The encoder 2 takes the GUID and adds one of the 128 'bits' of the GUID adjacent, sequentially in turn, to 132 of the detected areas 12, as described above. The code can be placed a plurality of times at different locations throughout coded data.

The coded data 10 output from the encoder is a summation of the original data 6 and the digits of the code 8 generated. The digits are aligned, and have a melodic relationship with the original data such that the sound quality of the coded data is comparable to the original data. Not only is the signal to noise ratio kept low but the code is placed such that it is imperceptible to the ear of a professional music producer because of the melodic relationship.

Many coding strategies can be used and the aforementioned placement of a code with a single-wavelength data 'bit' is just one strategy. Alternatively, for example, three bits could be added to the data with a single-wavelength space between each bit. Each code can represent one of 7 different keys between the frequency of the preceding data in the location and up to one octave higher. In this way, with 7 variables and 3 bits, 84 combinations are possible and the capacity of the coded data can be increased.

The coding strategy can also utilise a plurality of notes in a key. The placement criteria, having detected the absolute and/or relative pitch at, for example, an onset of an attack, can recognise that a digit can be placed adjacent one or more of the key signatures of a chord on a diatonic scale, such as an 'A Major $7^{th}$' (AM7), in which a root note 'A', $3^{rd}$ factor C#, $5^{th}$ factor 'E' and major $7^{th}$ 'G#' are played simultaneously. The coding strategy can utilise the four different frequencies for the placement of a digit. Therefore, rather than just considering a single note, or the root of a chord, the coding strategy can decide whether to place a digit, with a harmonic or sympathetic relationship, aligned with two or more notes with the AM7 chord.

Figure 5:
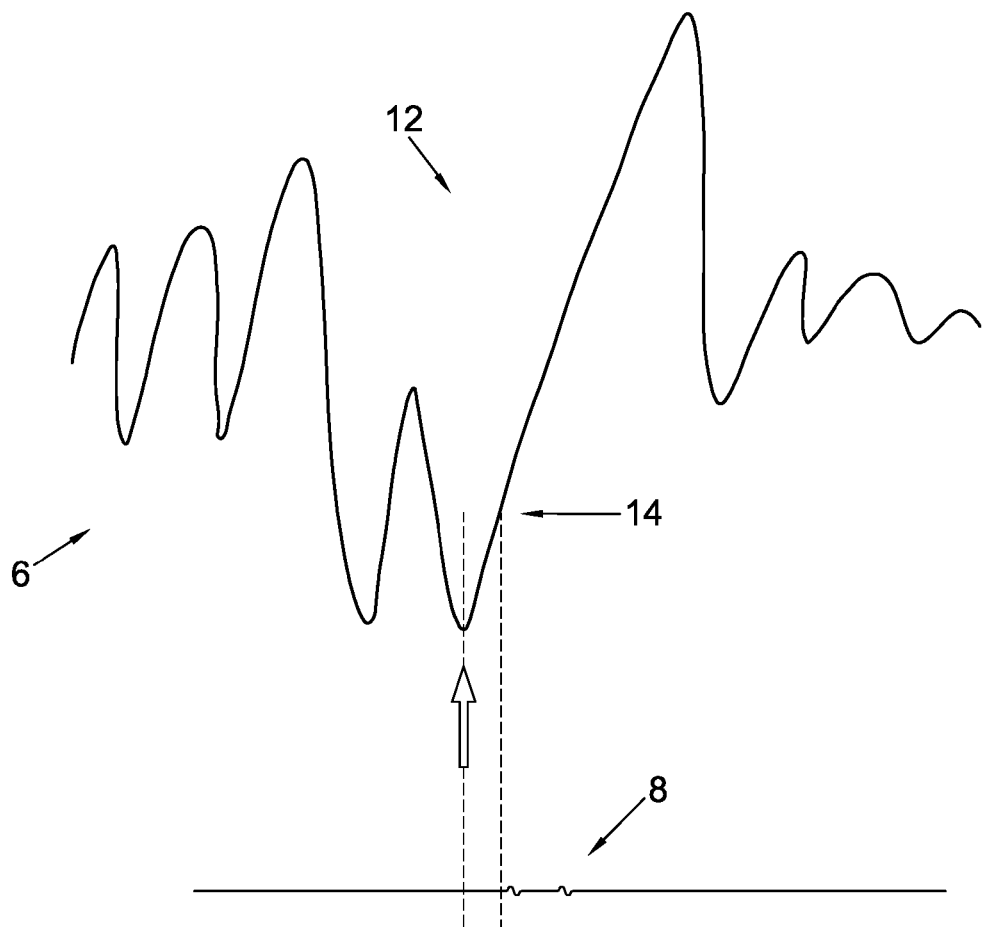
FIG. 5 illustrates the positional relationship between the original data and the location of the code with respect to the original data.

FIG. 5 shows the determined area 12 and the location 14 at which a digit 8 is placed with respect to the original data. In particular, the digit is shown placed with respect to a start of an attack to illustrate an aspect of the coding strategy for determining the location and format of the digit.

It is to be noted that different cultures around the world use different numbers of intervals in music and it is primarily this, and the way in which the intervals are used rhythmically, that uniquely defines a culture's sound. A digit to be placed, therefore, can be formatted to have a melodic or sympathetic relationship with the data in other ways. The invention is agnostic to the origins of the original data having audio data to be encoded.

Playback of original data 6 and coded data 10 sounds the same to a professional ear. This is achieved by the digit placed having a harmonious relationship with the original data, which is true in real-time, or within the time-domain. The area 12 in which a digit is placed, however, can have one or more frequencies or pitches. A frequency domain analysis, using a fast Fourier transform (FFT) or discrete Fourier transform, of the original data in the area 12 would identify dominant frequencies. If, for example, the area 12 of the original data was found to have a single note A (440 Hz) then a placed digit having a frequency of 880 Hz would be melodic with the original data in real-time, while the digit would be dominant in the frequency domain such that it was identifiable though FFT analysis or the like. Even if the determined area were to comprise a number of dominant frequencies should, for example, the determined area 12 represent an 'A major' chord played on a piano then notes 'A', 'C#' and 'E' would be heard simultaneously and a digit having a frequency of 880 Hz added thereto, would be melodic and imperceptible to a human ear. Although, the digit would remain dominant in the frequency domain such that it was identifiable though FFT analysis or the like a higher level of processing power is required, with results having more noise, compared to identification of the digits from coded data using FFT analysis together with the placement criteria and/or coding strategy, which enables efficient recognition of the digit with minimal error.

The method can analyse original data using a frequency domain approach, such as a Fast Fourier Transform (FFT) to determine or estimate, heuristically, the structure of the content and index it appropriately. A "table of contents" for the original data under analysis can be formed. From this table, or index, an appropriate dictionary of signals or digits that can be added to the original data can be identified.

The dictionary, or set of digits that can form the code, can be created to ensure detectability when the process is reversed during decoding. The coding structure is not fixed or limited and the GUID is given by way of example only. The digits can be using a variety of coding structures. By way of example, each 32-bit hexadecimal GUID could be configured to start with an 'FF' to indicate the start of a GUID, thus facilitating detection during decoding.

It is emphasised that by decoding using the same method it is not necessary to store any additional information within the coded data, such as meta-data outside of the musical structure itself—for example, in the headers of the file format container (MP3, AAC) or in an ancillary file.

The method of the invention is also such that the analysis and placement of a digit of a code can be a one-time event, and multiple instances of the encoded data can be produced from a single analysis. Therefore, many codes can be generated and added to original data to produce coded data that can, for example, be used to trace the origin of the original data or provide royalty management and rights distribution services. For example, three versions of a piece of original data of each file—dividing the globe into three main territories).

Decoding

The decoder 4 of FIG. 1 operates in a similar manner to the encoder 2. Coded data 10 is fed in to the decoder, which then processes the coded data to output at least one of (i) a code 8 compiled from identified digits, (ii) coded data 10 and (iii) original data. The encoder and decoder can work independently, as shown in FIG. 1a, or form part of a single device as per FIGS. 1b and FIG. 8.

Coded data 10 is primarily comprised of media data, having audio content, such as a music video, piece of music or music track. Coded data 10 fed in to the decoder is analysed to identify where in the data a code could have been placed. The means for determining in which areas a code can be placed are the same as those found in the encoder 2. The means for determining the format and/or location of the digits of the code are also the same as those found in the encoder.

The original data is not changed during the encoding process. If variations from the original data occur during playback of encoded data, in the region where a code has been placed, or occur due to errors or corruption of the coded data during transmission or conversion, then the code can be placed and/or repeated a number of times throughout coded data. The probability of the code being detected is also increased if the start of playback of coded data begins mid-way through the audio.

For each area of the coded data 10 in which the decoder determines that a code can be found, the decoder 4 analyses the coded data 10 to identify one or more characteristics of the original data, such as an audio characteristic. The coding strategy used to place the code is used to identify the code. Therefore, the data in this region is scanned, preferably around a predetermined location 14 within the area 12, to identify a portion of the data that is separate from the original data, wherein the format of the portion has a melodic relationship with a characteristic of the original data. The digits identified are accumulated to assemble a code.

Using the example given for encoding, described above, coded data can be scanned and areas 12 determined. The area 12 is indicative of an attack where the volume of music increases. When such an attack is identified, and the decoder can measure the pitch or frequency of the music within the data is measured. Areas 12 are analysed, preferably around a location 14 within an area 12. By way of example, the pitch of the attack in a determined area is measured as being a note "A" above Middle-C on a piano keyboard, with a frequency of 440 Hz. Following the onset of the attack the decoder scans for 'blips', signals or other such deviations in frequency that are not part the musical characteristics of the original data.

One such deviation can be a signal having a period of one wavelength in phase with said 440 Hz note but having a frequency of 880 Hz. This deviation, or digit, has a melodic relationship with the characteristic of the data in the area 12—and the decoder recognizes that the digit is in harmony with the note "A" detected by being one octave higher than the note in the original data. The format of the digit 8 can be recognized, therefore, as a digit of the code.

The digit has a melodic relationship with the original data detection is inhibited in the time-domain by a human ear. Although processing using a FFT can be used to identify a digit, and scanning the original data precisely and accurately (when compared to a human ear) and can identify such 'blips' or digits, the decoding is preferably carried out using the same deterministic criteria and/or strategy that was used to place the digit—this reducing the level of processing required and/or the error rate during detection.

Even if the amplitude of the placed digit is lower than the amplitude of the characteristic of the corresponding original data at said location the decoder can pick out the digit 8. This is because the decoding is deterministic and mirrors the encoding process. In a reverse manner to encoding the relationship between the original data and the detected digit of a code can determine the 'value' of that digit, as described above in relation to FIG. 4. It is to be noted that decoding can selectively identify areas and analyse said areas for digits of a code deterministically as the coded data is played back. Overall, however, the addition of a digit, sympathetically or melodically, to original data to produce coded data, is done in a manner that requires a low level of processor resource—both for coding, and decoding. The simplicity of the digit addition and detection is such that a high level of computational complexity is not required.

The decoder can accumulate and/or concatenate the digits to compile the code. The decoder can be configured to output at least one of the code 8, media data 6 or coded data 10. Applications of the encoder and the decoder of the invention will be described below.

As described above, playback of original data 6 and coded data 10 sounds the same to a professional ear. Placement of the code 8 is sufficiently robust that decoding coded data 10 can be carried out by (i) identifying the determined area 12, and scanning those areas and/or the locations 14 therein, for digits and/or (ii) sweeping all of the coded data 10.

The code 8 within the coded data 10 is robust, in part, because the placed digit is harmonious with the original data in the time-domain, or real-time but distinguishable from the original data even if the determined area were to comprise a number of dominant frequencies. Repeating the example above, original data having an 'A major' chord played on a piano and having notes 'A', 'C#' and 'E' heard simultaneously would have a digit having a frequency of 880 Hz added thereto. The digit would be melodic and imperceptible to a human ear but as a dominant frequency identifiable though FFT analysis or the like.

Placement Criteria

An encoder 2 or a decoder 4 seeking to determine where a digit of a code 8 can be placed, or found, within original data 6 or coded data 10, respectively, can do so in a number of ways to further inhibit detection of the digit 8 in the time-domain. Although it is preferable to select an area 12 of original data when encoding original data because selective placement of a digit can further inhibit code detection, the decoding of coded data to identify and extract a code does not necessarily require selecting determined areas because a full sweep or analysis can be performed. It can be preferable to identify determined areas when decoding because this reduces the level of processing required to identify the code, thus enabling the reduction of power consumption, cost etc.

The method used to determine an area 12 for placing a digit 8 when encoding can similarly be used for identifying a digit when decoding. The invention uses psychoacoustic techniques to further mask a digit placed within the original data.

By way of example, the invention utilises areas in the original data where an 'attack' occurs.

An attack is indicative of a sudden increase in volume and the human ear cannot easily discern the quality of an audio signal because of the change in amplitude of the audio signal. In its simplest form the invention can use onset detection to select a determined area 12 for placement of a digit. In light of the teaching herein the determination can use one or more detection functions to detect on-set. The invention can simultaneously monitor and analyse different frequency ranges, or DFT bins, because the characteristics of different onset detection varies according to the source of the audio data e.g. different instruments being played [2]. Determination can include onset detection from at least one of a time-domain signal, spectrogram, high-frequency content, spectral difference, spread of the distribution of phase deviations, wavelet regularity modulus, and negative log-likelihood using an ICA model.

The method, upon detecting the rate-of-change of one or more characteristics of the original data, selects an area of original data where a digit of the code is to be placed. The location in which the digit is placed can be within the determined area following a start point of a rate of change.

One of the frequencies detected within the area 12, such as a frequency with a dominant amplitude and/or attack, is analysed. The phase of said frequency can be detected. Following detection of the frequency and measurement of its frequency and phase the digit of the code to be added to the original data, for compilation to become coded data, is translated in to, for example, a digit that has a melodic relationship with said frequency in the original data. Continuing with the previous example, if said dominant frequency were a concert pitch 'A' then the digit added would be either twice or four-times the frequency of the dominant frequency, and be in phase with the dominant frequency of the original data.

Overall, with the characteristics of the original data identified, including the pitch or frequency of a characteristic of the original data, preferably with the (i) greatest amplitude and/or (ii) rate-of-change of a characteristic of the original data that meets a placement criteria, a digit of the code can be placed in an area where detection by a human ear is inhibited.

With a determined area 12 identified the location 14 at which a digit is to be placed can be selected. The location can be a predetermined time from a start point of a determined area. The predetermined time can be 0.05 seconds, or thereareound. Alternatively, with the characteristics of the area 12 known, the digit can be placed at a set number of periods from the beginning of the determined area. In practice, the digit is preferably placed as close to the start of a determined area as practical—that is, as soon as a suitable area is detected. This can improve the placement of digits in live streaming original data, such as the audio output at a concert, conversation, pod-cast, video conferencing such as a Skype™ call, where the length of an attack is unknown.

If the method is to be applied to original data to produce coded data in a studio, before distribution, analysis of the original data can be performed once. The analysis can produce an "index" of areas and/or locations where a digit can be placed. Each piece of original data can be unique and each area therein can accommodate digits of differing complexity. If the original data contains calm and classical music then adding digits of code in binary form, by doubling or quadrupling the frequency of the original data in the area 12 can be used (as described above). If, in contrast, original data contains heavy metal music then there are a greater number of areas in which digits of code can be placed, and the format of the digit can be varied to provide a more complex range of digits. This can allow a more complex code to be implemented.

Further, by decoding original data in the same manner as encoding the original data can be analysed and the coded data assessed to identify key information, such as what format of the digit provides minimal or zero detection and/or what are the optimum locations for adding a digit to the original data to provide coded data. With analysis, the digits of the code can be added to the original data, overlaying it, within the frequency domain, with the original data to produce coded data.

Once sufficient locations within the original data have been identified and the digits of the code added the producer of the music, having used the method, can distribute the coded data in a different form, such as MP3 or AAC, via media data outlets, such as Amazon, Google Play, Netflix and the like.

Coding Strategy

As described above the method of the invention can identify an area 12 and/or a location 14 at which to add one digit of a code 8 to original data 6. The method can add one digit of code in each determined area 12 throughout the original data. Alternatively, more digits can be placed such that a series of digits is added in an area 12.

By way of example, each area 12 can have a series of 4 digits. The digits of a code can be placed sequentially. Each digit can be one or more periods, of the frequency of the original data, in length. The inventors have realised, however, that as the number of digits per area is increased the code becomes increasingly perceptible to the human ear when coded data 10 is played back. The number of sequential digits in an area is preferably less than 20, and preferably less than 10. Optimum performance can be achieved by placing only a single digit in a determined area 12.

Robustness

The coded data 10 output from an encoder 2 can be passed or transmitted in a number of ways. This can include digital transmission, transmission through resampling, analogue transmission or transmission through a medium such as air, before being picked up by a microphone [1].

Digital transmission does not affect the file and is substantially received, as sent. No limitations are placed on the addition of digits to original data before transmission. Similarly, no limitations are placed on analogue transmission because, in the time-domain, the digit of the code has a melodic relationship with the original data in the region where it is added.

Resampling can result in changes to the temporal characteristics of a data. However, by adding a digit with a melodic relationship with the original data, said relationship having, for example, a harmonic difference such as an octave of difference between a characteristic of the original data and the digit, retains a difference in the frequency domain thus overcoming any loss through conversion. Although challenging, the coded data is considered to be robust for transmission through a medium for the same reasons.

Application Features

Using a computer implemented process, or software, a code can be added to original data at the point of distribution. A software insertion technique can be used. For each piece of original data, code can be automatically inserted in an audio component the original data in real time, such that there is no lag or delay for the consumer.

The code is then communicated to and automatically stored on a remote server together with associated Meta data. The software can function in the same way as any software based mixing desk for music production.

Addition of a code can happen at the distribution stage such that the owner and/or distributor can be assigned to the unique code added to the original data. By adding a unique code at the point of distribution every track purchased can be tracked using the software when decoding said track. In this way, the origin of original data that is coded and subsequently streamed can be identify the original distributor or buyer of the data. By way of example, prohibited distribution by a distributor entrusted with a pre-screening of an unreleased movie can be detected independently of any source, reference or original data that is needed for comparison. The coded data can be independently analysed and the entrusted distributor identified.

A central service provider, hosted by a remote server, can manage the encoding and decoding in a similar manner, for example, to a Google analytics engine. The call to assign the code to original data can come from this service together with the recording of the user assignment. Thereafter, all playback and/or recording activities involving the unique code are monitored as instances by the server. The server can be used to report on use of audio, such as; Performing Rights Society (PRS) and Phonographic Performance Ltd (PPL) monitoring; marketing; tracking customers habits; radio play; and tracking content that is streamed illegally. For example, the original source of illegal movie streams, taken in cinemas, private screenings, downloads or even music concerts, can be traced.

It is to be stressed that the method of encoding of the invention is to professional music producer standards and, therefore, acceptable to recording artists that cannot compromise the quality of their recorded material with poorly encoded data.

A decoder or reader of coded data can be implemented on electronic devices such as mobile phones, tablets, personal computers and the like. Coded data played on these devices can be monitored to identify the original source file owner (consumer, cinema chain etc.) via the server. Meta data within the device in which the coded data is being played can be used to identify the device on which prohibited distribution or streaming is occurring.

Any original data, whether new or old, can be coded at the point of distribution.

This means that anyone who creates new original data and shares, posts or streams said data after it has been coded can be identified and confirmed as the owner or distributor. Similarly, anyone illegally holding or sharing any content anywhere in the world be tracked. All content posted or physically held by anyone in the world can be tracked to confirm their legitimate ownership. The source and right holder/owner of any content can be discovered without need for the source file.

The addition of a code to original data, at the point of distribution, is such that a movie downloaded to a local device for playback is coded before being sent. The code can provide information on the owner and the person downloading the movie. If the movie is then ripped and streamed, the source of the file can be identified (by decoding through subsequent playback) without the original owner needing to show that the source file is in the illegal distributor's possession. This extrapolates out across regions, territories, formats, platforms, sharing methods for film, TV, music and any content with an audio component. It can also track movies in cinemas or concerts.

Application Embodiments

The invention resides in methods, as claimed, and in apparatus configured to implement the or each method. Codes or messages can be created and added to original data in a vast number of ways. The content of the code can represent an equally vast number of messages.

The inventors prefer, however, to utilise a GUID or similar type of code with high integrity in combination with a system configured to manage the code and manage at least one of code tracking, recording, cataloguing and reporting system.

By combining the method of encoding, as claimed, the number or digits placed in original data can be minimised and the method, and code, placed, works together with the system to manage the code. A combination of discrete code placement using a code with integrity and communication between a local and remote management system provides for a robust and secure means of coding original data and managing he use of said data.

Even if a code, such as a GUID, were identified its registration and registration with a remote server functions to retain a level of security and control over the coded data. The use of a code such as a GUID in combination with a remote server ensures a secure history of the codes, and therefore the original data's, use.

The local and/or remote management systems provide additional infrastructure for the invention. The management systems support functions including copyright enforcement, usage and royalty tracking.

Local System

The local management systems can be implemented on, or distributed with, applications and/or operating systems, such as end user devices, e.g. smart phones. Provision on personal devices can provides a mechanism for tracking usage. A local management system can provide at least one of the following functions: to decode an coded data or a file containing coded data; to encode original data which has not yet been encoded; and to track and report the encoding and/or use of data to a remote management system.

It is anticipated that the main use of the local management system will be to decode coded data and report the use thereof. When in this mode the local management system, embedded in either the playback software or the local operating system of the device in which it resides identifies coded data and reads the code therein. The use of the coded data together with additional details, such as the time the code was read, the name of the device, the location etc, is reported to the remote management system. By way of example, if a user downloads a music track having coded data from the internet and plays it through their music player on their phone then software on the phone, having the local management system, can read the code from the music track. The phone can report the details of the event (code, time played etc.), or store said details, for sending to the remote management system.

The local management system can also be configured to encode original data and/or coded data when coded data is played.

If the local system does not detect a code within the data being played then the original data can be encoded. The code added can be reported to the remote system together with details of the device used to play the track including at least one of the time, location, etc. Because there was no code in the original data the remote system can only track subsequent playback of the encoded track. By way of example, a video streaming service, on playback, discovers that no code is present in the data being played. The local system can then add a unique code to the data, which is original data. If recorded, or played back, this becomes coded data.

Information associated with the initial playback of uncoded original data can be reported to the remote server. The remote server is then able to track any subsequent playback of data recorded from that playback, should it be played again, because it was encoded during playback. Alternatively, a device operating the method of the invention to detect a code can prevent playback if no code is detected.

Optionally, if the local management system detects a code in data being played back it can be further encoded. Coded data that is further coded can be referred to as multi-coded data, which means that data has a plurality of unique and independent codes therein. The placement of the second and subsequent codes can use different placement criteria and/or coding strategies in order to differentiate them from one another. The second and subsequent codes can be added by chaining the codes, such as a GUIDs, in the encoded data.

Further encoding can be used to trace unauthorised use of coded data. This method includes recognising that coded data being played back is restricted for, for example, copyright reasons. By way of example, the recognition can be achieved by the decoder recognising at least one of (i) the pattern of the digits or the code placed in coded data, which can be achieved by, for example, placing a digit of the code on each alternate determined area identified, and (ii) comparing the code or format of the code against a local or remote lookup table.

If the local system recognises unauthorised or restricted playback a further code can be added to already coded data to create multi-coded data. The codes added can be reported to the remote system together with details of the device used to play the track including at least one of the time, location, etc. By way of example, a pre-release movie screening that is unofficially taken for copying will be recognised by a local system as being for restricted use and add a further unique code to the coded data to produced multi-coded data. The multi-coded data has two codes embedded therein and information associated with the initial playback of coded data can be reported to the remote server, and the newly added code can also be sent to the remote server such that any subsequent playback of multi-coded data recorded from that playback, should it be played again, also be reported to the remote system.

Remote System

The remote management system functions to provide a number of services including aggregation of local management system information, encoding services, reporting and analytics. The remote system can be a suite of RESTful endpoints, APIs and data stores which receives event data from the MSS Clients and third-parties and provide information back to these applications.

The remote system can be highly scalable, distributed, highly-fault tolerant, high transactional services which records all data gathered from the encoding or decoding in the systems. The remote system can handle a high volume of traffic as potentially millions of clients using local systems will be reporting data in real-time.

The remote system can be configured to run on a cloud-based service and be configured to be implemented by, or engage, with a number of processes, including:

Tracking by the Local Management System.
 In this process, the local system has recorded the playback of coded data and/or recorded and/or reported the event. This process can silent synchronise when a network connection is available. This process can cache the information collected during playback and bulk update as required.

Collection by an Element of the Remote Management System.
 In this process endpoints receive the event data from the local systems and places it in a queue to output the events. This process functions to queue all non-processing information to be acted upon by further upstream processes. The infrastructure supporting this process can be scalable to deal with large volumes of data being passed by the Tracking process of the local system.

Enrichment by an Element of the Remote Management System.
 In this process raw event data recorded by the tracking system is at least one of parsed into constituent parts, transformed or enriched with additional data and normalised ready for storage. For example, the enrichment process can provide associated information on a music file such as the artist and track name associated with the coded data.

Storage by an Element of the Remote Management System or S4erver.
 In the storage process, enriched data can be stored into various databases and file systems for subsequent retrieval. Retrieval from storage can be in either real time calls from third-party applications and/or local systems or by a reporting and analytics services.

Reporting/Analytics by an Element of the Remote Management System.
 In this process modelled data can be available for analysis and to be reported on this or subsequently processed to provide additional services.

Encoding as a Service by an Element of the Remote Management System.
 The remote management system can have all of the functionality of a local management system. A user connecting to the remote system can access the services provided by both the local and remote systems. Therefore, for specific tasks, such as large or bulk coding of original data, such as digital media streams, the remote management system can accommodate large scale tasks. By way of example, a video streaming service wishes to encode a video on demand so that any end user receiving the video stream can be fully identified as a recipient of the stream (coded data). The remote system can (i) implement encoding directly in the video streaming service via an API implementation or (ii) use the remote management system to hand-off the encoding process normally performed at a local system.

Events/Data Models

The remote management system provides a number of services but primarily manages events occurring in the local management system, and sometimes within the remote management system itself. The events are, in effect, packages of information that can be reported on.

At least two events from which information is modelled and/or stored, which can be:

(i) Encoding events, where a local or remote management system creates coded data (or multi-coded data) by adding a code to original data (or coded data). This can occur when uncoded original data, such as a music track, is played and the local system adds a code to create coded data.

Data for an encoding event can include one or more of:
The unique ID of the Sonic Key
The MAC Address of Encoding Device
The IP of the Encoding Device
Timestamp of Encoding on the Device
Timestamp of Encoding Reporting to the Services
The details of the file/stream that is being played e.g. the name of the music track or movie, the playtime length, etc.
Rights holder of the file
Purchase date
Price paid
Date of purchase
Purchase referrer
License type
Platform information e.g.:
 Device type
 OS Software
 Playback Software
A collection of user data related to the platform or service that may be provided e.g.:
 User Name
 Email
 Geo Location
 Date of Birth
The information associated with the event can be irregular and sparse because not all data may be retrievable by devices due to a variety of issues, from the information that is actually available on the platform to security issues.

(ii) Playback events, wherein a local or remote system detects and manages information associated with the playback.

Figure 6:
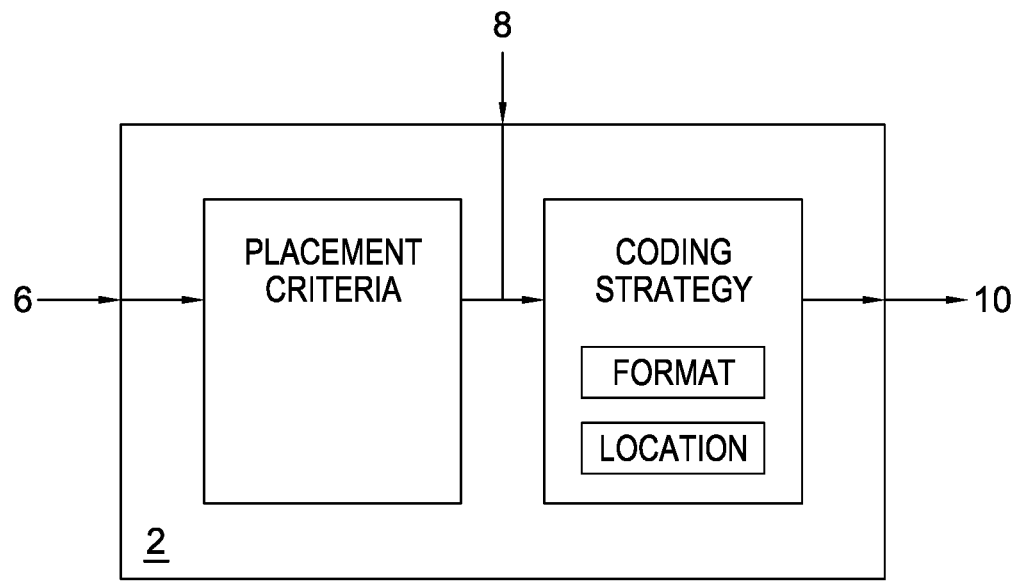
FIG. 6 is a schematic view of an encoder according to the invention.
Figure 7:
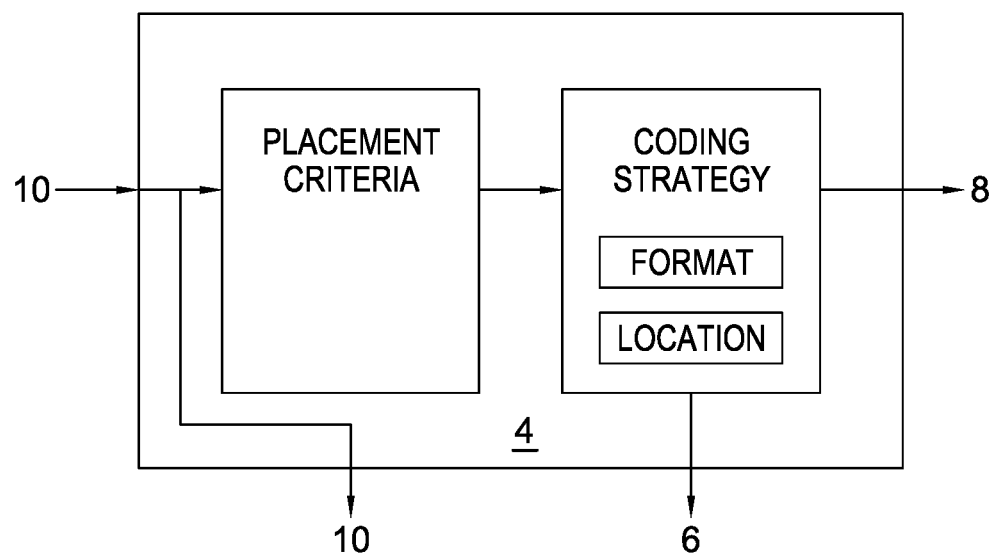
FIG. 7 is a schematic view of a decoder according to the invention.

Data for an encoding event can include one or more of:
The unique ID of the Sonic Key (required)
The MAC Address of Decoding device
The IP of the Decoding device
Timestamp of Decoding on the device
Timestamp of Decoding reporting to the MSS Services
The details of the file/stream that is being played e.g. the id of the music track or movie Rights holder of the file
Permissions to Playback
Platform information e.g.:
   Device type
   OS Software
   Playback Software
A collection of user data related to the platform or service that may be provided e.g.:
   User Name
   Email
   Geo Location
     Date of Birth
A collection of playback information such as
   Length of playback
   Any pause/play events The information associated with an event can be irregular and sparse because not all data may be retrievable by devices due to a variety of issues, from the information that is actually available on the platform to security issues. Implementation By way of example, the encoder 2 and/or decoder 4 can be implemented by the components shown in FIGS. 6 and 7, which show the functions of a device 100 that can implement the method described herein. Original data 6 having audio data that is received by a device 2,4 can be in analogue or digital format, but is preferably a digital data stream. Using digital signal processing techniques and frequency domain analysis, such as fast-Fourier transforms, a placement criteria identifies areas in the data stream where a digit of a code can be placed. The determination of the areas for placement can use, for example, pitch detection. It can also use onset detection or similar analysis techniques, e.g. to detect an attack. Using the attack as an example, one or more notes of the attack can be identified—this can be an absolute pitch of a single note, or can also be the relative pitch. The device can additionally detect a plurality of notes in a chord, such as an A-major-$7^{th}$.

The processing and analysis can be carried out 'live' such that code can be added to create coded data 10 that is output from the encoder. The encoder has a processor (not shown) that can take a code to be added, break it down in to component parts, and add each component part according to a coding strategy which can determine the format and/or the location at which the code component is added. The encoder can then add the component part of the code to the original data and output this as coded data 10. The digits of the code can be added in relation to a single note, the root of a chord or signatures of a chord—or combinations thereof.

The placement criteria and coding strategy of the encoder 2 and decoder 4 are the same and are re-configurable. Said criteria and strategy function as a 'key', or algorithm, for aiding the subsequent identification of a code within coded data.

Coded data 10 received by a decoder 4 is analysed in the same way as the original data is analysed in the encoder 2. This is possible because the code is substantially imperceptible to the human ear and, also, to a machine analysing the coded data. Therefore, the coded data is recognised by the decoder in the same way original data is recognised by the encoder. The placement criteria used to identify areas in which code could be placed is unaffected by the presence of code, which is inconspicuous amongst the audio data, and once areas are identified the coding strategy is used to spot the code, or digit or component thereof, because the format and location is anticipated, using the 'key' or algorithm.

By the decoding using a placement criteria and coding strategy the method deterministic and independent or agnostic to the original data. The content of the audio data does not matter such that a code can be added and subsequently identified in a piece of classical music in the same way as a piece of rock music—this is because the invention identifies characteristics of the music and adds code to form coded data (or identifies code in coded data) in a determined manner. If the same code were added to a piece of classical music and a piece of rock music the format and location of the code would be unique in each case.

Further, the or each aspect of the invention applied in encoding can be applied to decoding by applying the same logic. Therefore, the deterministic nature and coding strategy can be a key used to find digits and lower the cost and lower the error rate of doing so.

Figure 8:
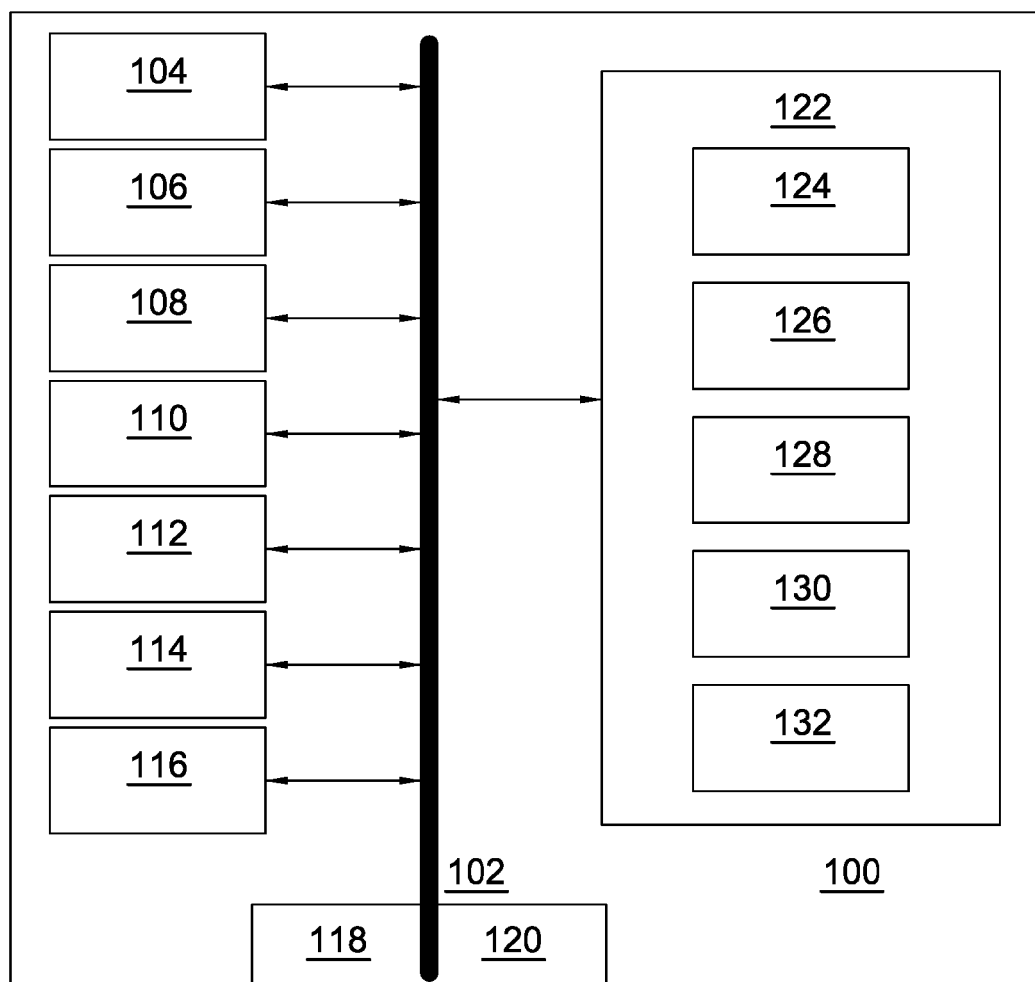
FIG. 8 is a block diagram of a device that can be configured to implement the invention.

FIG. 8, is an example of an apparatus or computer system having a device 100. The device 100 can be scalable in size and across different locations to implement an aspect or method of the invention described herein. The device can also be representative of an audio playback device such as a mobile phone.

The device 100 includes a bus 102, at least one processor 104, at least one communication port 106, a main memory 108 and/or a removable storage media 110, a read only memory 112 and a random access memory 114. The components of device 100 can be configured across two (2) or more devices, or the components can reside in a single device 10. The device can also include a battery 116. The port 106 can be complimented by input means 118 and output connection 120. The processor 104 can be any such device such as (but not limited to) an Intel(R), AMD(R) or ARM processor. The processor may be specifically dedicated to the device. The port 106 can be a wired connection, such as an RS-232 connection, or a Bluetooth connection or any such wireless connection. The port can be configured to communicate on a network such a Local Area Network (LAN), Wide Area Network (WAN), or any network to which the device 100 connects. The read only memory 112 can store instructions for the processor 104.

The bus 102 communicably couples the processor 104 with the other memory 110, 112, 114, 108 and port 106, as well as the input and output connections 118, 120. The bus can be a PCI/PCI-X or SCSI based system bus depending on the storage devices used, for example. Removable memory 110 can be any kind of external hard-drives, floppy drives, flash drives, for example. The device and components therein is provided by way of example and does not limit the scope of the invention. The processor 104 can implement the methods described herein.

The processor 104 can be configured to retrieve and/or receive information from a remote server or device. The device can be an input means 14 that is in addition to, or is an alternative, to the input means of the functional area 18.

The device 100 can also include an analyser 122, to receive original data received by the device 100 and analyse the characteristics thereof. The analyser can include a pitch detector 124 that can scan audio data to identify the pitch or frequency of the audio data. The analyser can also include an onset detection module 126 for detecting a rise in amplitude of an audio signal within the original data in the time domain. A Fast Fourier Transform (FFT) module 128 and Inverse FFT 130 can be provided to analyse original data or coded data in the frequency domain. A code generator and/or compiler 132 is provided.

The present invention has been described above purely by way of example, and modifications can be made within the spirit and scope of the invention, which extends to equivalents of the features described and combinations of one or more features described herein. The invention also consists in any individual features described or implicit herein.

[1] W. Bender, D. Gruhl, N. Morimoto and A. Lu, Techniques for Data Hiding, IBM Systems Journal, Vol. 35, Nos 3 & 4, 1996, pp 313-336

[2] BELLO et al.: A TUTORIAL ON ONSET DETECTION IN MUSIC SIGNALS, IEEE TRANSACTIONS ON SPEECH AND AUDIO PROCESSING, VOL. 13, NO. 5, SEPTEMBER 2005.

The invention claimed is:

1. A method of placing a code, having a plurality of digits, in original data having media data including audio data, such as a music video, piece of music or music track, to produce coded data, the method:
   determining an area of original data where a digit of the code can be placed to inhibit detection using a placement criteria;
   applying a coding strategy to determine at least one of the format or location of a digit of the code in coded data, wherein the or each digit of the code have a melodic or sympathetic relationship with a characteristic, such as an audio characteristic, of the corresponding original data in the at the location in which it is placed, wherein the method estimates one or more characteristics of the original data at said location based on the original data preceding the location of the digit; and
   adding a digit to the original data and outputting coded data.

2. The method according to claim 1, wherein the format of the digit imitates one or more characteristics of the original data preceding the location of the digit.

3. The method according to claim 1, wherein the method extrapolates characteristics of the original data preceding said location to calculate the characteristics of the original data at said location.

4. The method according to claim 1, wherein the format of the placed digit, at said location, has a harmonic relationship with the characteristics of the corresponding original data at said location.

5. The method according to claim 1, wherein the amplitude of the placed digit is lower than the amplitude of the characteristic of the corresponding original data at said location.

6. The method according to claim 1, wherein the pitch of the placed digit compared to the pitch of the corresponding original data at said location, differs by at least one of one or more octaves, overtones or semi-tones.

7. The method according to claim 1, wherein determining a determined area of original data includes analysing changes of one or more characteristics of the original data and selecting an area of original data where a digit of the code is to be placed by placing a digit of the code that is sympathetic or melodic with the selected characteristic of said area.

8. The method according to claim 1, wherein determining a determined area of original data includes detecting a rate of change of one or more characteristics of the original data and selecting, using a placement criteria, an area of original data following a start point or detection of a rate of change of one of said detected changing characteristics for placement of a digit of the code.

9. The method according to claim 1, wherein a digit of the code is placed in said determined area at a location which is a predetermined time from a start point of a determined area.

10. The method according to claim 1, wherein the pitch or frequency of the original data in the determined area is identified and the digit is placed a predetermined number of periods from the start of the determined area of original data in which the digit of the code is to be placed.

11. The method according to claim 1, wherein characteristics of the original data are identified including the pitch of a characteristic with the (i) greatest amplitude and/or (ii) rate-of-change of a characteristic of the original data that meets a placement criteria, to determine an area of original data where a digit of the code is to be placed.

12. The method according to claim 1, wherein characteristics of the original data in the determined area are identified, including the pitch of a characteristic of the original data that meets a placement criteria, and wherein the length of a digit of the code is one period of said pitch.

13. The method according to claim 1, wherein the coded data comprises two audio signals or channels, such as left and right audio channels for stereo sound, and the signals representing the digits in each channel are substantially 180-degrees out of phase.

14. A method of analysing coded data having a code therein, said code having a plurality of digits, and original data having media data including audio data, such as a music video, piece of music or music track, to identify said code, the method comprising:
   reading the coded data, using a placement criteria, to determine an area of original data where a digit of said code can be placed to inhibit detection;
   determining in said determined area, using a coding strategy, at least one of the format or location of a digit of the code in coded data;
   identifying a digit of the code at a location in the determined area, wherein the digits of the code have a melodic or sympathetic relationship with a characteristic, such as an audio characteristic, of the corresponding original data in the determined area in which it is placed, wherein the method estimates one or more characteristics of the original data at said determined area based on the original data preceding the determined area at which the digit is placed; and
   assembling said code from identified digits.

15. The method according to claim 14, wherein determining a determined area of original data includes analysing changes of one or more characteristics of the original data and identifying an area of original data where a digit of the code can be placed and reading the coded data in this location to identify a digit of the code that is sympathetic or melodic with the selected characteristic of said area.

16. The method according to claim 14, wherein determining a determined area of original data includes detecting a rate of change of one or more characteristics of the original data and identifying, using an identification criteria, an area of original data following a start point or detection of a rate of change of one of said detected changing characteristics for placement of a digit of the code.

17. The method according to claim 14, wherein characteristics of the original data are identified including the pitch of a characteristic with the (i) greatest amplitude and/or (ii) rate-of-change of a characteristic of the original data that meets a placement criteria, to determine an area of original data where a digit of the code is placed.

18. The method according to claim 14, wherein the method adds a second code to coded data to generate multi-coded data.

19. The method according to claim 14, wherein the method extracts a plurality of codes from multi-coded data.

20. A device for placing a code, having a plurality of digits, in original data having media data including audio data, such as a music video, piece of music or music track, to produce coded data, the device comprising a controller having:

an analyser configured to scan original data, or coded data having original data, to determine an area of original data, where a digit of a code can be placed to inhibit detection, using a placement criteria; and an electronic processor configured to apply a coding strategy and determine at least one of the format or location of a digit of the code in coded data; and an electronic processor configured to add a digit to original data to produce coded data and/or identify a digit of a code within coded data, wherein the digits of the code have a melodic or sympathetic relationship with a characteristic, such as an audio characteristic, of the corresponding original data at the location in which it is placed.

21. The device according to claim 20, wherein the device is configured to add a second code to coded data to output multi-coded data and/or extract a plurality of codes from multi-coded data.

22. A system having the device according to claim 20, the system having a data store configured to communicate with a remote server having a store, the system configured to at least one of (i) store information associated with each code, (ii) track information associated with each playback of coded data, and (iii) store revisions of information and (iv) record changes of the code.

23. A non-transitory computer storage medium storing one or more programs, said programs having instructions for placing a code, having a plurality of digits, in original data having media data including audio data, such as a music video, piece of music or music track, to produce coded data, which when executed by an electronic computing device perform the following steps:

determining an area of original data where a digit of the code can be placed to inhibit detection using a placement criteria;

applying a coding strategy to determine at least one of the format or location of a digit of the code in coded data, wherein the or each digit of the code have a melodic or sympathetic relationship with a characteristic, such as an audio characteristic, of the corresponding original data at the location in which it is placed, wherein the method estimates one or more characteristics of the original data at said location based on the original data preceding the location of the digit; and adding a digit to the original data and outputting coded data.

\* \* \* \* \*